(12) United States Patent
De Salivet de Fouchecour et al.

(10) Patent No.: US 10,796,191 B2
(45) Date of Patent: Oct. 6, 2020

(54) DEVICE AND METHOD FOR PROCESSING A HISTOGRAM OF ARRIVAL TIMES IN AN OPTICAL SENSOR

(71) Applicants: STMicroelectronics SA, Montrouge (FR); STMICROELECTRONICS (RESEARCH & DEVELOPMENT) LIMITED, Marlow (GB)

(72) Inventors: Francois De Salivet de Fouchecour, Palaiseau (FR); Stuart McLeod, Edinburgh (GB); Donald Baxter, Stirling (GB); Olivier Pothier, Sceaux (FR); Thierry Lebihen, Bourg la Reine (FR)

(73) Assignees: STMicroelectronics SA, Montrouge (FR); STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 121 days.

(21) Appl. No.: 16/142,544

(22) Filed: Sep. 26, 2018

(65) Prior Publication Data
US 2020/0097752 A1   Mar. 26, 2020

(51) Int. Cl.
*G06K 9/46* (2006.01)
*G06T 7/521* (2017.01)
*G06T 7/162* (2017.01)

(52) U.S. Cl.
CPC ............ *G06K 9/4647* (2013.01); *G06T 7/162* (2017.01); *G06T 7/521* (2017.01); *G06T 2207/10028* (2013.01); *G06T 2207/20072* (2013.01); *G06T 2207/20076* (2013.01); *G06T 2207/30242* (2013.01)

(58) Field of Classification Search
CPC ........ G06K 9/4647; G06T 2207/10028; G06T 2207/20072; G06T 2207/20076; G06T 2207/30242; G06T 7/162; G06T 7/521
See application file for complete search history.

(56) References Cited

U.S. PATENT DOCUMENTS

2019/0383739 A1* 12/2019 Rothberg ........... G01N 21/6408

* cited by examiner

*Primary Examiner* — Diane D Mizrahi
(74) *Attorney, Agent, or Firm* — Slater Matsil, LLP

(57) ABSTRACT

An example device has optical emitters for emitting incident radiation within a field of view and optical detectors for receiving reflected radiation. Based on the incident radiation and the reflected radiation, a histogram indicative of a number of photon events that are detected by the optical detectors over time bins is generated. The time bins is indicative of time differences between emission of the incident radiation and reception of the reflected radiation. The device further includes; a processor programmed to iteratively process the histogram by executing an expectation-maximization algorithm to detect a presence of objects located in the field of view of the device.

20 Claims, 13 Drawing Sheets

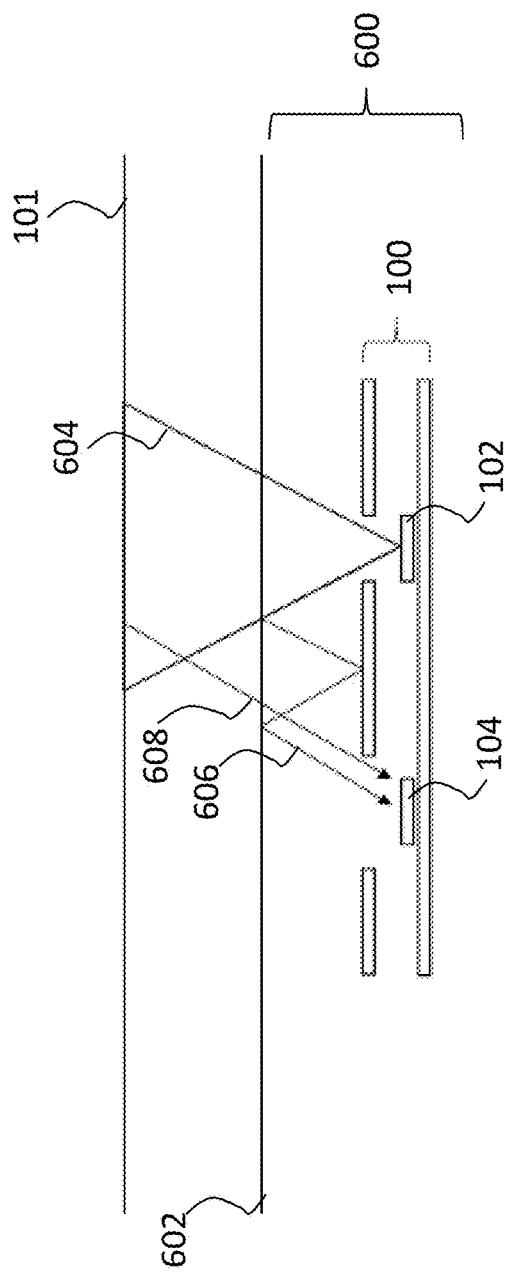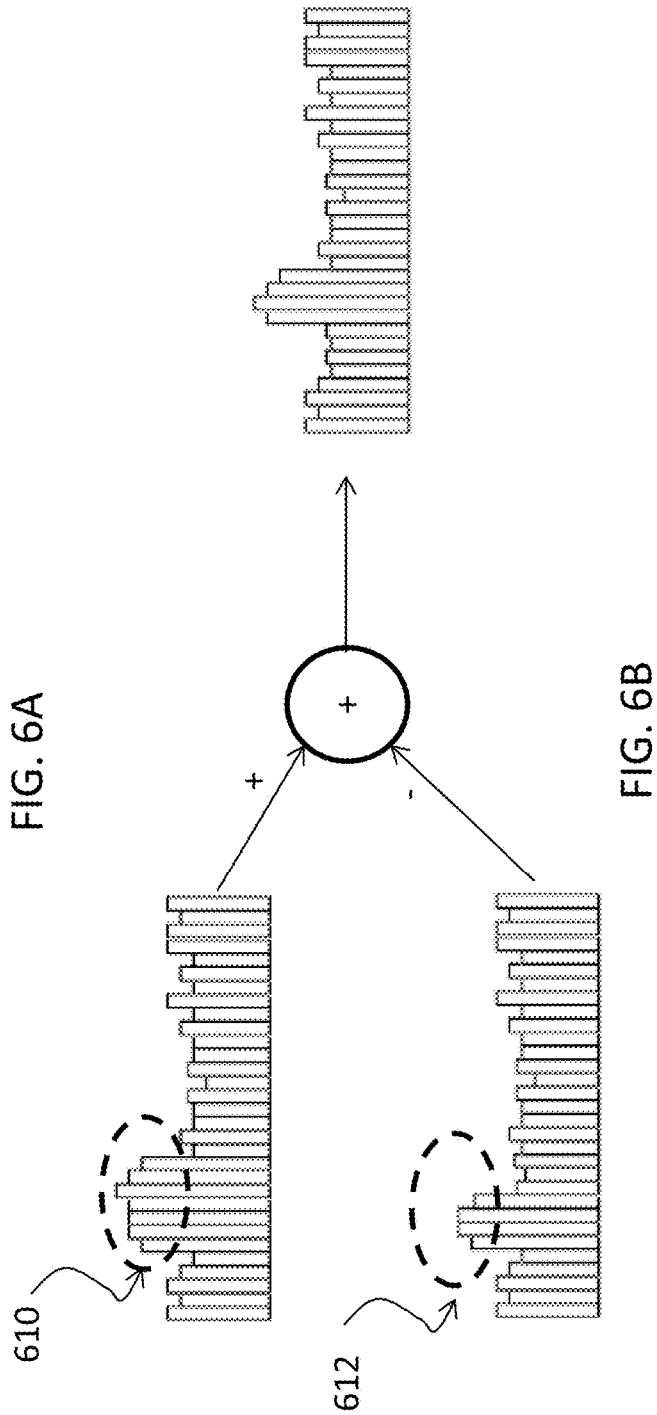
FIG. 6A
FIG. 6B the following descriptions taken in conjunction with the accompanying drawings, in which:

FIG. 1 shows a sensor and an object positioned in front of the sensor, in accordance with an embodiment;

FIG. 2A shows an enlarged view of an optical source of the sensor shown in FIG. 1, in accordance with an embodiment;

FIG. 2B shows an enlarged view of an optical detector of the sensor shown in FIG. 1, in accordance with an embodiment;

FIG. 3 shows a schematic view illustrating the operation of the optical sensor shown in FIG. 1, in accordance with an embodiment.

FIG. 4 shows an example of raw histogram data generated by an optical detector of the optical sensor shown in FIG. 1.

FIG. 5 shows a process flow illustrating steps executed by the processor of the optical sensor shown in FIG. 1.

FIGS. 6A and 6B show examples where cross-talk may interfere with the determination of the range of an object.

FIG. 7 shows a simple example of a pulse segmentation operation executed on histogram data.

FIGS. 8A and 8B show examples of raw histogram data generated after reception of a reflected optical signal from one or more objects.

FIG. 9 shows an example of a probability density function having a center at a first time bin and having a spread of a plurality of time bins.

FIGS. 10A and 10B illustrate a method for estimating a parameter set, including a pulse spread and a pulse center, using an Expectation-Maximization algorithm, in accordance with an embodiment.

FIGS. 11A, 11B, 12A, and 12B show linear regressions of a first moment and a second moment as functions of estimated pulse centers and the estimated spread factors, in accordance with an embodiment.

Corresponding numerals and symbols in the different figures generally refer to corresponding parts unless otherwise indicated. The figures are drawn to clearly illustrate the relevant aspects of the embodiments and are not necessarily drawn to scale.

DEVICE AND METHOD FOR PROCESSING A HISTOGRAM OF ARRIVAL TIMES IN AN OPTICAL SENSOR

TECHNICAL FIELD

The present disclosure relates generally to optical sensors and in particular embodiments, to a device and method for processing a histogram of arrival times in an optical sensor.

BACKGROUND

Time-of-flight (TOF) imaging techniques are used in many depth mapping systems (also referred to as 3D mapping or 3D imaging). In direct TOF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. A histogram of arrival times is typically built up over many cycles of transmission and reception, and is then processed to locate the statistical peak. Efficient methods of processing the histogram of arrival times and locating the statistical peak may be needed in order to allow for accurate determinations of depth and/or distance from the light source to an object located in the field-of-view of the light source.

SUMMARY

An embodiment device includes: a plurality of optical emitters configured to emit incident radiation within a field of view of the device; a plurality of optical detectors configured to receive reflected radiation and to generate a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and a processor configured to iteratively process the histogram by executing an expectation-maximization algorithm to detect a presence of objects located in the field of view of the device.

An embodiment method includes: emitting incident radiation using a plurality of optical emitters of a sensor device; receiving reflected radiation using a plurality of optical detectors from one or more objects located in a field of view of the sensor device; generating, by a processor, a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and iteratively processing the histogram by executing an expectation-maximization algorithm to determine a number of the one or more objects located in the field of view of the sensor device.

BRIEF DESCRIPTION OF THE DRAWINGS

For a more complete understanding of the present invention, and the advantages thereof, reference is now made to

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Embodiments of this disclosure provide a system and method that enable close targets with overlapping histogram signatures to be detected and discriminated by providing a distinct range measurement for each target. Embodiments of this disclosure provide a system and method that also enable effective target detection in scenarios where there is a low signal to ambient noise ratio. It is noted that these effects provide improvements are necessarily rooted in the time-of-flight technology that employs time-of-flight sensors.

Figure 1:
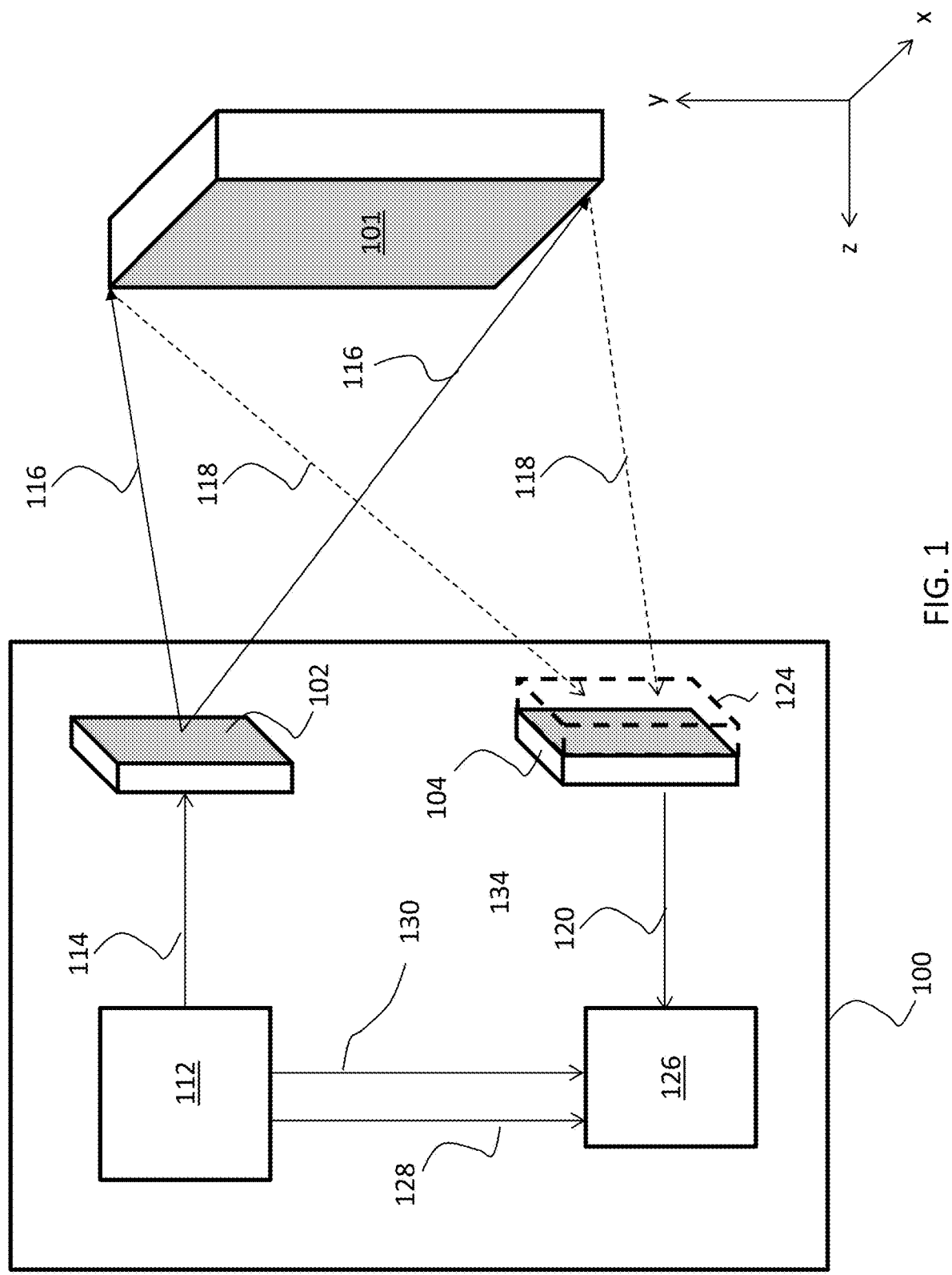

FIG. 1 shows an optical system including an optical sensor 100 (hereinafter referred to as a "sensor") and an object 101 positioned in front of the sensor 100, in accordance with an embodiment. The sensor 100 may be used to determine the proximity of the object 101 to the sensor 100 (e.g. a distance of the object 101 from the sensor 100). For example, the object 101 may be a human hand and the sensor 100 may be used to detect the proximity of the human hand to a mobile communications device (e.g. a cell phone) that includes the sensor 100. Additionally or alternatively, the sensor 100 may be used to capture or reconstruct an image (e.g. a two-dimensional (2D) or a three-dimensional (3D) image) of the object 101.

Figure 2B:
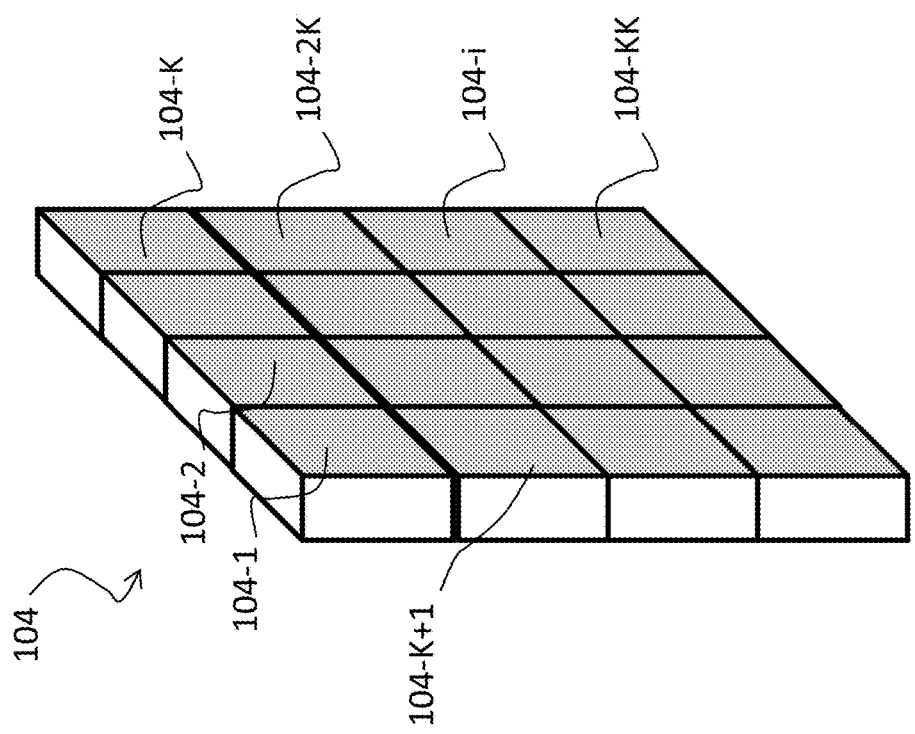
Figure 2A:
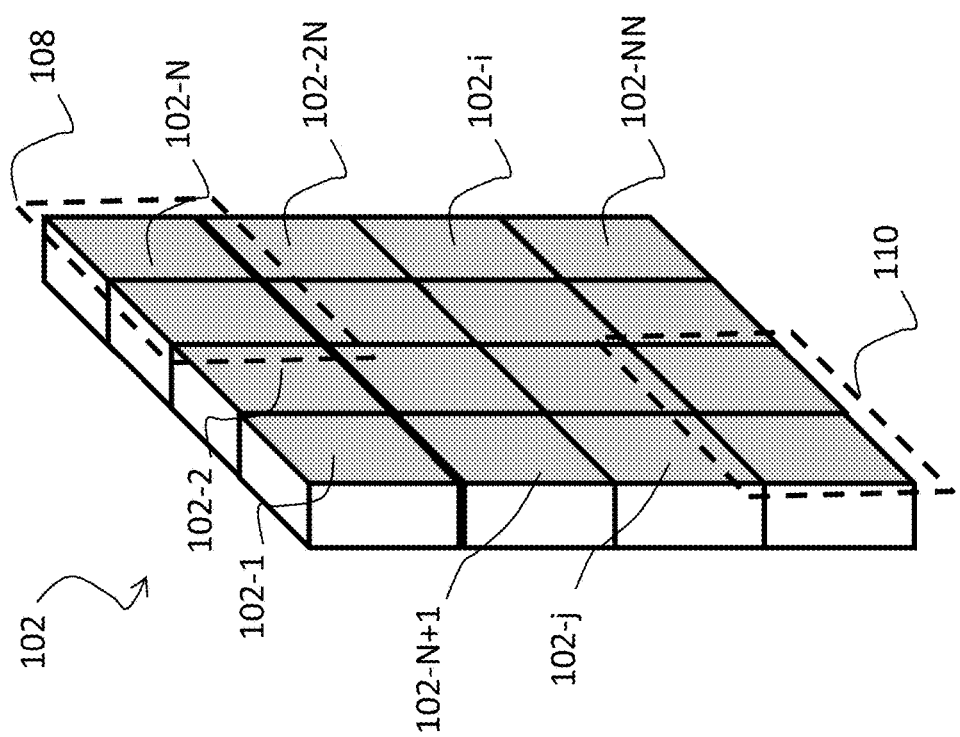

The sensor 100 may include an optical source 102 and an optical detector 104. FIG. 2A shows an enlarged view of the optical source 102, in accordance with an embodiment. As depicted in FIG. 2A, the optical source 102 may include a plurality of optical emitters 102-1 to 102-NN arranged as an array. Although the example of FIG. 2A illustrates the optical emitters 102-1 to 102-NN as being arranged in a square N×N array, other array shapes (e.g. ellipsoidal arrays or circular-shaped arrays) may be possible in other embodiments. Each of the optical emitters 102-1 to 102-NN may include one or more infrared sources, modulated light emitting diodes (LEDs), semiconductor lasers, or combinations thereof, although other types of optical emitters may be possible. In an embodiment where the optical emitters 102-1 to 102-NN include semiconductor lasers, an optical emitter 102-$i$ of the array of optical emitters 102-1 to 102-NN may include one or more vertical-cavity surface-emitting lasers (VCSELs), quantum well lasers, quantum cascade lasers, inter-band cascade lasers, or vertical external-cavity surface-emitting lasers (VECSELs), or the like.

The optical emitters 102-1 to 102-NN may be configured to operate at the same wavelength. In other embodiments, however, the optical emitters 102-1 to 102-NN may operate at different wavelengths. For example, different spatial regions 108 and 110 of the array of optical emitters 102-1 to 102-NN may operate at different wavelengths. The optical emitters 102-1 to 102-NN may exhibit continuous wave (CW) operation, quasi-continuous wave (QCW) operation, or pulsed operation.

Referring back to FIG. 1, the sensor 100 may include a programmable current driver 112. The operation of the optical emitters 102-1 to 102-NN may be controlled by the programmable current driver 112, which is configured to generate a drive current 114 that is capable of activating the array of optical emitters 102-1 to 102-NN, thereby causing the optical emitters 102-1 to 102-NN to emit photons. As an example, in pulsed operation, the drive current 114 provided to the optical emitters 102-1 to 102-NN of the optical source 102 may have a rise time and a fall time of about 100 picoseconds or less, thus allowing the programmable current driver 112 to modulate the optical emitters 102-1 to 102-NN of the optical source 102 at a frequency of 10 GHz or greater.

The array of optical emitters 102-1 to 102-NN may be an addressable array of optical emitters 102-1 to 102-NN. In other words, the array of optical emitters 102-1 to 102-NN may be operated in an addressable mode. As an example, the optical emitters 102-1 to 102-NN may be individually addressable, where an optical emitter 102-$i$ (shown in FIG. 2A) of the array of optical emitters 102-1 to 102-NN is addressable independently of another optical emitter 102-$j$ of the array of optical emitters 102-1 to 102-NN. In such an example, the drive current 114 provided by the programmable current driver 112 to the optical source 102 may cause optical emitter 102-$i$ to be activated (and thereby emit a photon), while simultaneously causing optical emitter 102-$j$ to be deactivated (and thereby not emit a photon). As another example, the optical emitters 102-1 to 102-NN may be addressable as a group or cluster, where one group 108 of optical emitters 102-1 to 102-NN is addressable independently of another group 110 of optical emitters 102-1 to 102-NN. In such an example, the drive current 114 provided by the programmable current driver 112 to the optical source 102 may cause the group 108 of optical emitters 102-1 to 102-NN to be activated (and thereby emit a photon), while simultaneously causing another group 110 of optical emitters 102-1 to 102-NN to be deactivated (and thereby not emit a photon). An effect of operating the array of optical emitters 102-1 to 102-NN in an addressable mode is the ability to dynamically reconfigure an illumination pattern of the optical source 102 and/or an intensity level of each of the optical emitters 102-1 to 102-NN of the array of optical emitters 102-1 to 102-NN to adapt to various applications or environments.

Radiation emanating from the optical source 102, collectively shown in FIG. 1 as reference numeral 116 using solid arrows, is incident upon the object 101. The incident radiation 116 is reflected off the object 101 to produce reflected radiation 118. It is noted that although incident radiation 116 and reflected radiation 118 are represented in FIG. 1 by few arrows, in practice, all radiation incident on and reflected from the object 101 may actually be combined in one beam or cone of radiation. While some part of the incident radiation 116 may be scattered depending upon the surface features of the object 101, a significant part of the incident radiation 116 is reflected, thereby producing the reflected radiation 118.

The optical detector 104 receives the reflected radiation 118 and generates an output signal 120 in response to the reflecting radiation 118 striking the optical detector 104. The output signal 120 may be a digital signal or an analog signal, depending on the circuitry of the optical detector 104. FIG. 2B shows an enlarged view of the optical detector 104, in accordance with an embodiment. As depicted in FIG. 2B, the optical detector 104 may include a plurality of radiation sensitive pixels 104-1 to 104-KK, examples being photo diodes (PDs), avalanche photo diodes (APDs), single-photon avalanche diodes (SPADs), or combinations thereof. Although the example of FIG. 2B illustrates the radiation sensitive pixels 104-1 to 104-KK as being arranged in a square K×K array, other array shapes (e.g. ellipsoidal arrays or circular-shaped arrays) may be possible in other embodiments. The intrinsic spatial resolution of the sensor 100 may be determined by the resolution of the optical detector 104. For example, since the radiation sensitive pixels 104-1 to 104-KK in the embodiment of FIG. 2B are arranged as a K×K array, the intrinsic spatial resolution of the sensor 100 may be a K×K image. It is noted that the output signal 120 may be expressed as a K×K matrix of measurements, or a 1×K$^2$ vector of measurements, with each entry of the matrix corresponding to the signal received from a respective pixel of the plurality of radiation sensitive pixels 104-1 to 104-KK.

Depending on the distance between the object 101 and the optical source 102, ambient or stray background radiation may be comparable to or even higher than the reflected radiation 118 received at the optical detector 104 and this can manifest itself as poor optical signal-to-noise ratio (OSNR). However, the undesirable effect of ambient or stray background radiation may be reduced by utilizing VCSELS in the optical source 102, since VCSELS are configured to maintain a high intensity illumination on the object 101 even at relatively large distances between the object 101 and the optical source 102. Furthermore, radiation emitted from the array of VCSELs may be in a narrow wavelength band, and consequently, the effect of ambient or stray radiation may be reduced by placing an optional optical filter 124 having a pass band that matches the wavelength of the radiation emitted by the array of VCSELs at the optical source 102, thereby improving OSNR by filtering out ambient or stray radiation falling on the optical detector 104.

As shown in FIG. 1, the sensor 100 further includes a processor 126 configured to receive the output signal 120 and determine the proximity of the object 101 to the sensor 100 based on the output signal 120. The processor 126 can additionally reconstruct 2D or 3D images of the object 101 based on the output signal 120. With regards to determining the proximity of the object 101 to the sensor 100, different modes for proximity sensing and distance measurement may be used. In the simplest mode of proximity sensing and distance measurement, the programmable current driver 112 is programmed to drive all the optical emitters 102-1 to 102-NN in the array simultaneously to generate an illumination (e.g. a uniform illumination) over an area or region of interest (e.g. over at least a portion of the object 101). The intensity of the incident radiation 116 is available to the processor 126 through a processing signal 128 that is provided to the processor 126 by the programmable current driver 112. The processing signal 128 may include drive current information and one or more properties of the optical emitters 102-1 to 102-NN in the array of optical emitters 102-1 to 102-NN. The object 101, being present in the illuminated area, reflects the incident radiation 116 and the intensity of reflected radiation 118 may depend, at least in part, on the distance between the object 101 and the sensor 101 and/or surface features or textures of the object 101 that may scatter part of the incident radiation 116. In this mode of operation, the proximity measurement depends on the amount of radiation that is reflected off of the object 101.

The intensity of the reflected radiation 118, received at the optical detector 104, is compared to the intensity of the incident radiation 116. For example, the intensity of reflected radiation 118 from a part of the object 101 closer to the sensor 100 would be higher than the intensity received from a part of the object 101 farther from the sensor 100. Consequently, proximity of the object 101 (or of parts of the object 101) is determined, by the processor 126, by analyzing the relative intensities of the incident radiation 116 and the reflected radiation 118.

In a different mode of proximity sensing and distance measurement, the programmable current driver 112 is programmed to drive all the optical emitters 102-1 to 102-NN in the array of optical emitters 102-1 to 102-NN in a pulsed mode to generate short incident radiation pulses. The short radiation pulses from the optical source 102 illuminate the object 101 in a predetermined timing sequence or at predetermined timing intervals. The object 101, being present in the illuminated area, reflects the pulsed incident radiation 116 and the arrival times of the pulses of reflected radiation 118 at the optical detector 104 are proportional to twice the distance between the object 101 and the sensor 100, based on the speed of light in the measurement medium or environment. For this mode of proximity sensing and distance measurement, the optical source 102 may include semiconductor lasers (e.g. VCSELs), while the optical receiver 104 may include high speed photodetectors (e.g. SPADs). For this mode of proximity sensing and distance measurement, the optical detector 104 is configured to record at least one of arrival times, pulse shapes, or intensities of the pulses of reflected radiation 118. The pulses of reflected radiation 118 arrive at different times at the optical detector 104, depending on the respective distances between the different parts of the object 101 and the sensor 100. The pulses of reflected radiation 118 are detected synchronously with a timing signal 130 that is configured to cause the programmable current driver 112 to generate the pulses of incident radiation 116. In effect, in this mode of proximity sensing and distance measurement, the processor 126 analyzes a time-of-flight (ToF) between the pulses of incident radiation 116 travelling towards the object 101 and the pulses of reflected radiation 118 received at the optical detector 104 to determine the proximity of the object 101. A plurality of proximity measurements may be used to generate a comprehensive set of data to accurately determine both lateral spatial distances (e.g. in the x-y plane shown in FIG. 1) and depth (e.g. along the z-axis shown in FIG. 1).

In addition to determining the proximity of the object 101 to the sensor 100 based on the output signal 120, the processor 126 can also reconstruct 2D or 3D images of the object 101 based on the output signal 120. In general, to reconstruct a 2D image of the object 101 having L×L pixels, the K×K array of radiation sensitive pixels 104-1 to 104-KK at the optical detector 104 must be such that K is greater than or equal to L. Stated differently, the intrinsic spatial resolution of the sensor 100 may be a K×K pixel array and at least $L^2$ intensity measurements need to be made to reconstruct a 2D image of the object 101 having L×L pixels, consequently leading to the result that, in general, K is greater than or equal to L. Image quality depends, at least on part, on the number of radiation sensitive pixels 104-1 to 104-KK at the optical detector 104 (the intrinsic spatial resolution of the sensor 100) and/or the intensity of the incident radiation 116 striking the object 101.

Figure 3:
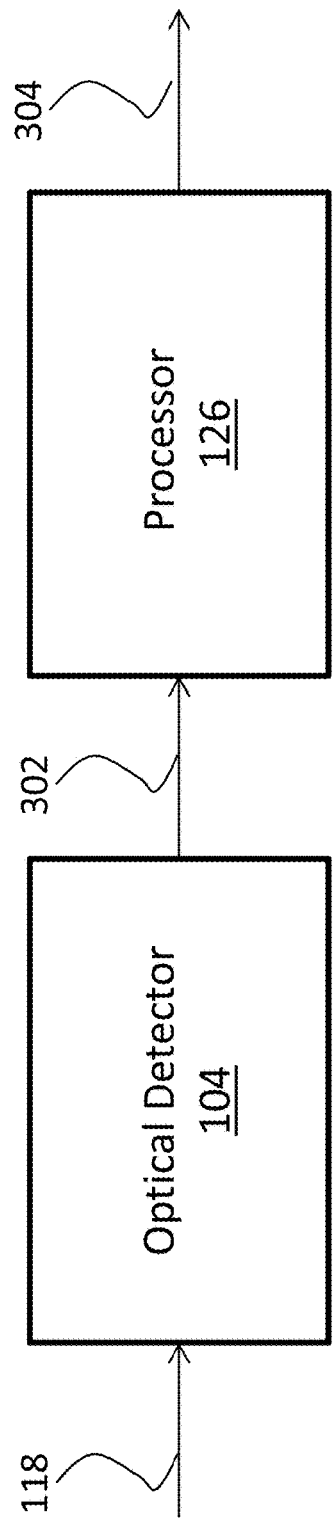

The above-described operation of the optical sensor 100 shown in FIG. 1 may be summarized by the schematic view shown in FIG. 3. In the example shown in FIG. 3, the optical detector 104 receives reflected radiation 118 (e.g. a light input signal). The optical detector 104 may be configured to output raw histogram data 302, which is passed to the processor 126. In this regard, the optical detector 104 may include a histogram generation circuit that outputs the raw histogram data 302, which is representative of photon event detection counts for a number of discrete time bins.

Figure 4:
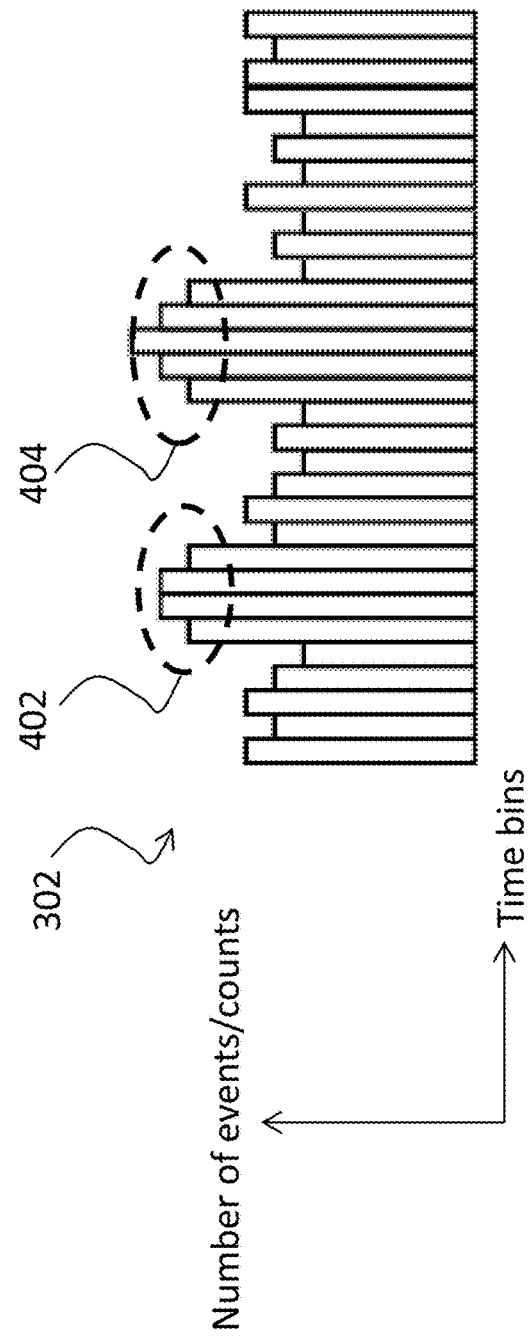

FIG. 4 shows an example of raw histogram data 302 generated by the optical detector 104. The example raw histogram data 302 in FIG. 4 is shown as a series of bars, where each bar represents a detected event frequency or event count for respective time bins or intervals. In the example shown in FIG. 4, two peaks may be observed, thereby preliminarily indicating two target/object reflections. The first reflection (indicated in FIG. 4 as bins 402) is shown as a first peak that is above an ambient level and that occurs earlier in time than a second reflection (indicated in FIG. 4 as bins 404). Referring back to FIG. 3, the processor 126 receives the raw histogram data 302 and processes the raw histogram data 302 to extract or generate suitable parameters 304, such as a distance or range output representing the distance between the optical sensor 100 and the object 101 within the field-of-view of the optical sensor 100. Other parameters 304 output from the processor 126 include a noise estimate and/or a maximum detection range.

Figure 5:
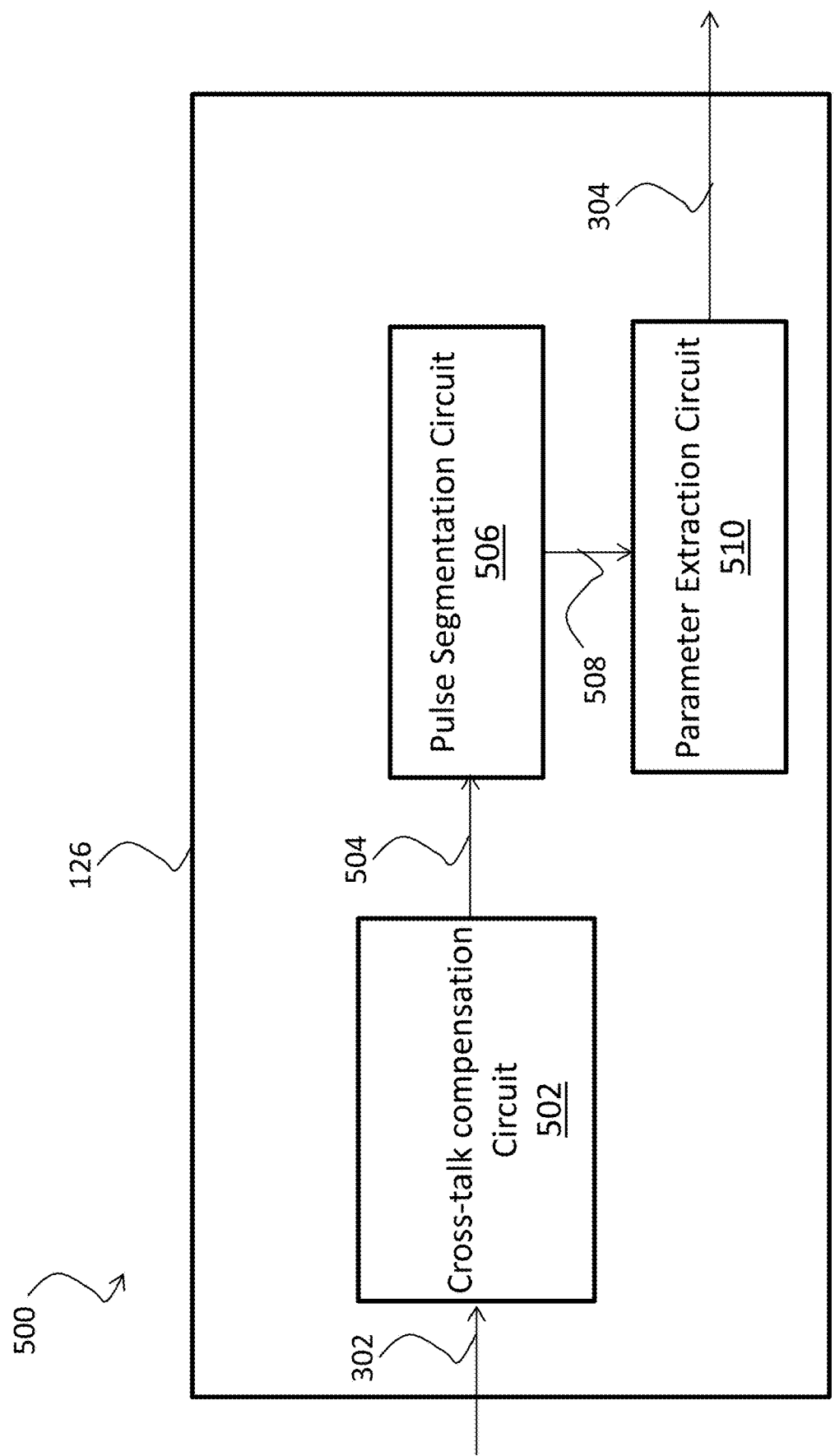

FIG. 5 shows a process flow 500 illustrating steps executed by the processor 126 of the optical sensor 100, in accordance with an embodiment. The process flow 500 illustrates that the processor 126 may include various processing modules or circuits configured to process the raw histogram data 302. The processor 126 may include a cross-talk compensation circuit 502, which determines whether the raw histogram data 302 includes cross-talk components and further removes, at least partially, the cross-talk components. In general, cross-talk is a term used to describe the effect of a parasitic light path on the raw histogram data 302 generated by the optical detector 104.

FIG. 6A shows an example where cross-talk may interfere with the determination of the range of the object 101. In the example of FIG. 6A, the optical sensor 100 is included in a mobile device 600 (e.g. a mobile phone) that includes a cover glass 602 that is disposed over the optical sensor 100. The optical source 102 (e.g. a VCSEL) generates incident light 604 directed towards the object 101. The incident light 604 may be reflected from the cover glass 602 and may travel along a cross-talk light path 606 to the optical detector 104. Furthermore, the incident light 604 may be reflected from the object 101 and may travel along a desired light path 608 to the optical detector 104. Therefore, the cross-talk light path 606 adds a contribution that may be detrimental to the determination of the distance between the optical sensor 100 and the object 101, particularly if the object 101 is in close proximity to the optical sensor 100. The effect of cross-talk components on the raw histogram data 302 is shown in FIG. 6B, where the raw histogram data 302 shows a group of pulses 610 with contributions from the cross-talk light path 606 (indicated as cross-talk component 612) and the desired light path 608. Consequently, the cross-talk compensation circuit 502 may be configured to de-correlate the cross-talk component 612 from the reflected radiation 118 returning from the object 101. The merging of the cross-talk component 612 and the reflected radiation 118 returning from the object 101 may produce a false object detection at a mid-point of the group of pulses 610 or may give rise to clipping due to an increased overall pulse width.

Furthermore, although cross-talk is shown in FIGS. 6A-6B as being a single point issue, the cross-talk effect may differ across a surface of the optical sensor 100. For example, the cross-talk component 612 may not be the same across the x-y dimension of the optical detector 104 and may vary linearly or a non-linearly across the x-y dimension of the optical detector 104. In view of the above, in order to compensate for the effect of the cross-talk component 612 on the raw histogram data 302, the optical sensor 100 may be configured to capture, even when no object of significant intensity is present, at least one reference histogram that provides the location, shape, and/or intensity of the cross-talk component 612, with such a reference histogram being used by the cross-talk compensation circuit 502 to generate cross-talk compensated histogram data 504 from the raw histogram data 302 (e.g. in the manner illustrated in FIG. 6B). It is noted that in some embodiments, the cross-talk compensation circuit 502 may be configured to further remove any ambient contribution from the raw histogram data 302 (e.g. by subtracting a determined fixed value or DC level or by optionally windowing out ambient noise).

Referring back to FIG. 5, the processor 126 may include a pulse segmentation circuit 506 configured to receive the cross-talk compensated histogram data 504. Although a single object 101 is shown in FIG. 1, in many applications, a plurality of such objects 101 may be located within the field-of-view of the optical sensor 100. Consequently, the raw histogram data 302 may include a superposition of pulses from multiple objects 101. As such, the pulse segmentation circuit 506 segments the cross-talk compensated histogram data 504 into individual pulses or objects 101, thereby generating a plurality of segmented histograms 508, with each of the plurality of segmented histograms 508 corresponding to reflected radiation 118 from a respective object 101. Consequently, the pulse segmentation circuit 506 is needed to isolate pulses from multiple objects 101 from a single histogram (e.g. the cross-talk compensated histogram data 504), thus enabling an optimal setup of a pulse-width histogram filter (e.g. in parameter extraction circuit 510, described below) on a per-object basis. This, in turn, prevents multiple objects from interfering with each other when range or distance determinations are being made. A simple example of pulse segmentation is illustrated in FIG. 7, where the cross-talk compensated histogram data 504 is provided to the pulse segmentation circuit 506, which determines that the single cross-talk compensated histogram data 504 includes data from two objects 101 and segments the single cross-talk compensated histogram data 504 into two segmented histograms 508a, 508b, where the segmented histogram 508a corresponds to a respective pulse (e.g. reflected radiation 118) from a first object, and where the segmented histogram 508b corresponds to a respective pulse (e.g. reflected radiation 118) from a second object.

The processor 126 further includes a parameter extraction circuit 510 that operates on each of the plurality of segmented histograms 508a, 508b individually to determine the parameters 304, such as a distance or range output, representing the distance between the optical sensor 100 and each of a plurality of objects 101 located within the field-of-view of the optical sensor 100. For example, referring to the simplified example of FIG. 7, the parameter extraction circuit 510 operates on the segmented histogram 508a to determine distance or range output representing the distance between the optical sensor 100 and the first object. Such a determination is carried out without interference or corruption from the segmented histogram 508b. Similarly, the parameter extraction circuit 510 operates on the segmented histogram 508b to determine distance or range output representing the distance between the optical sensor 100 and the second object, with such a determination being carried out without interference or corruption from the segmented histogram 508a. As discussed, this enables an optimal setup of a pulse-width histogram filter (e.g. in parameter extraction circuit 510) on a per-object basis.

Figure 7:
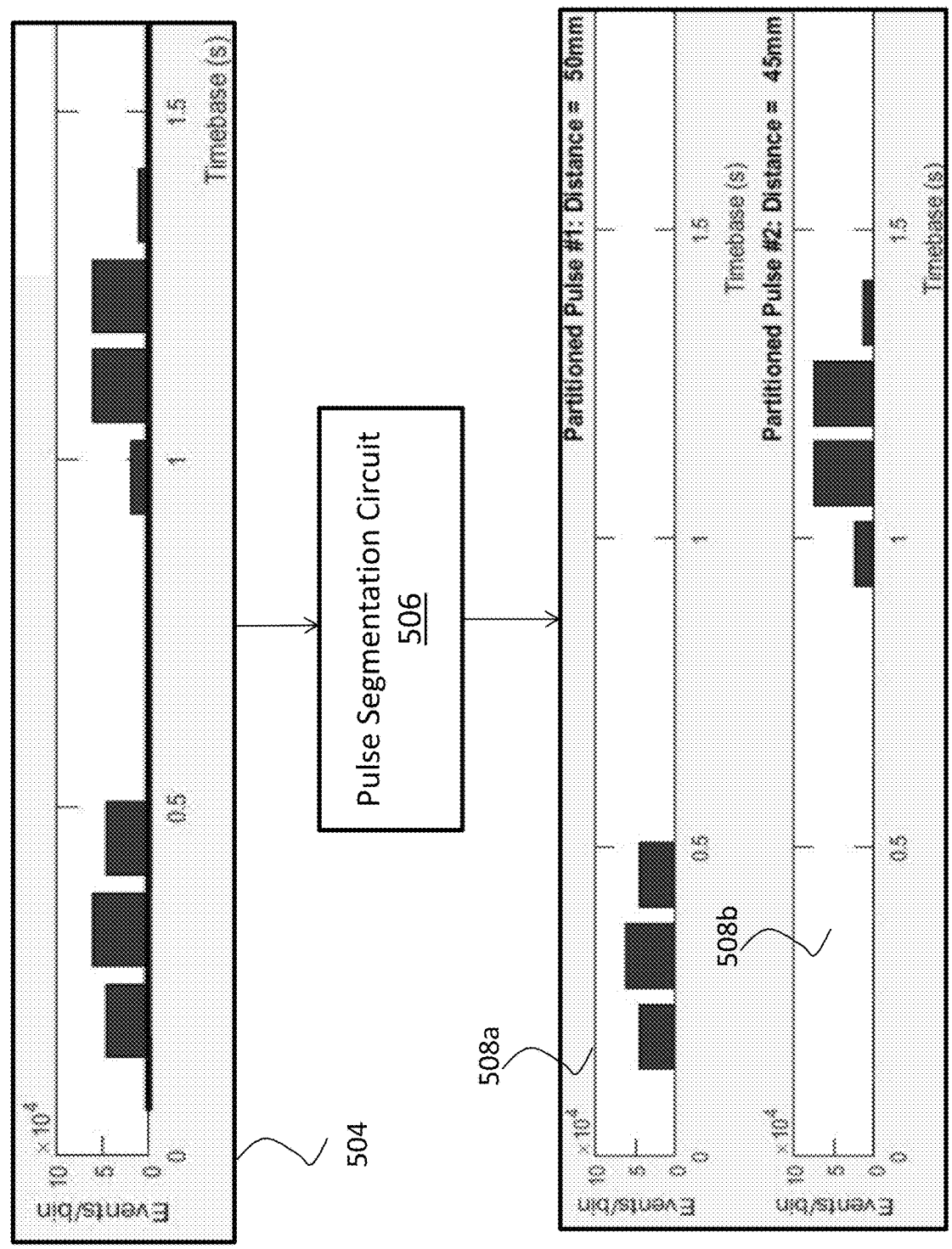
Figure 8A:
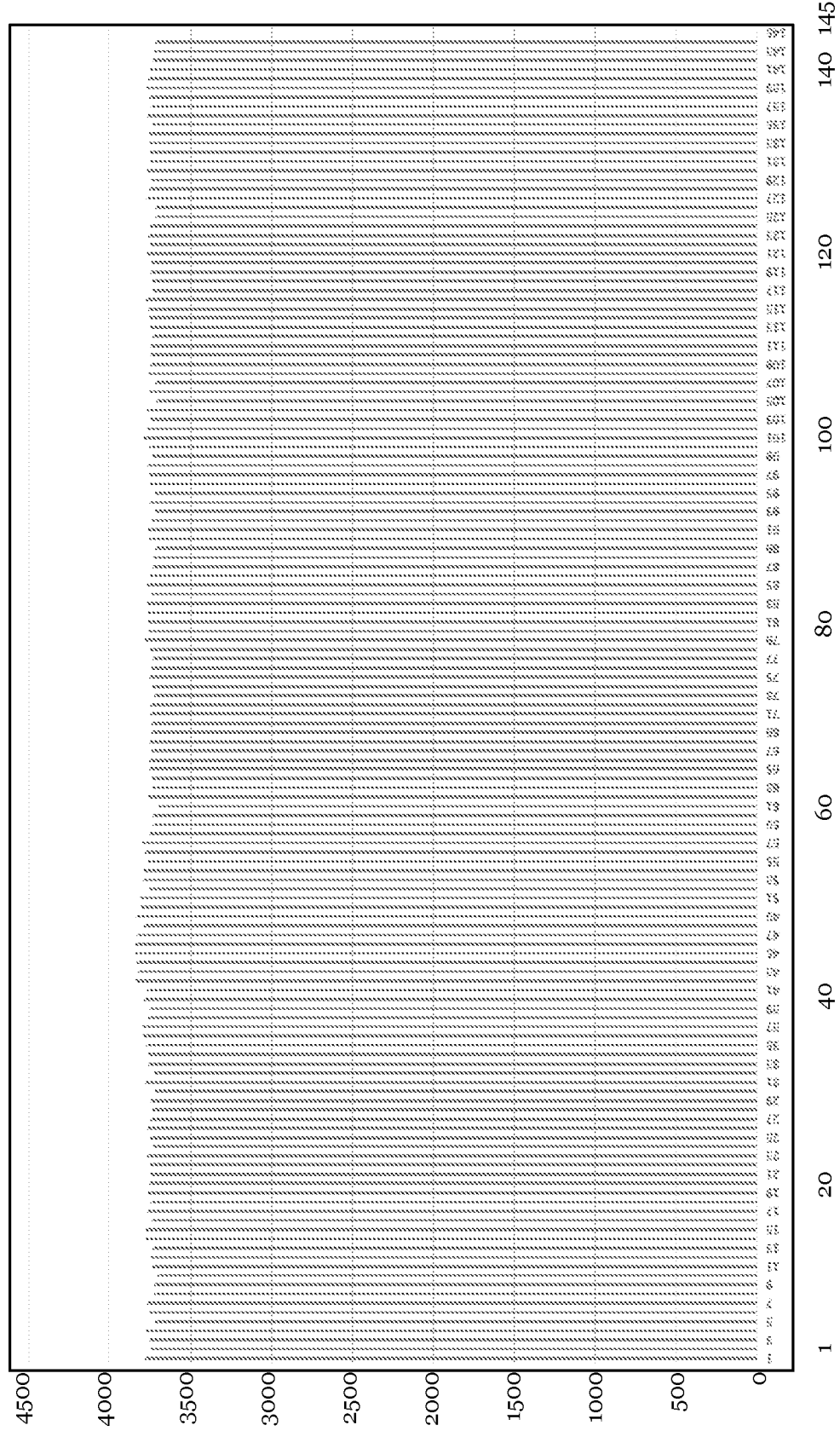
Figure 8B:
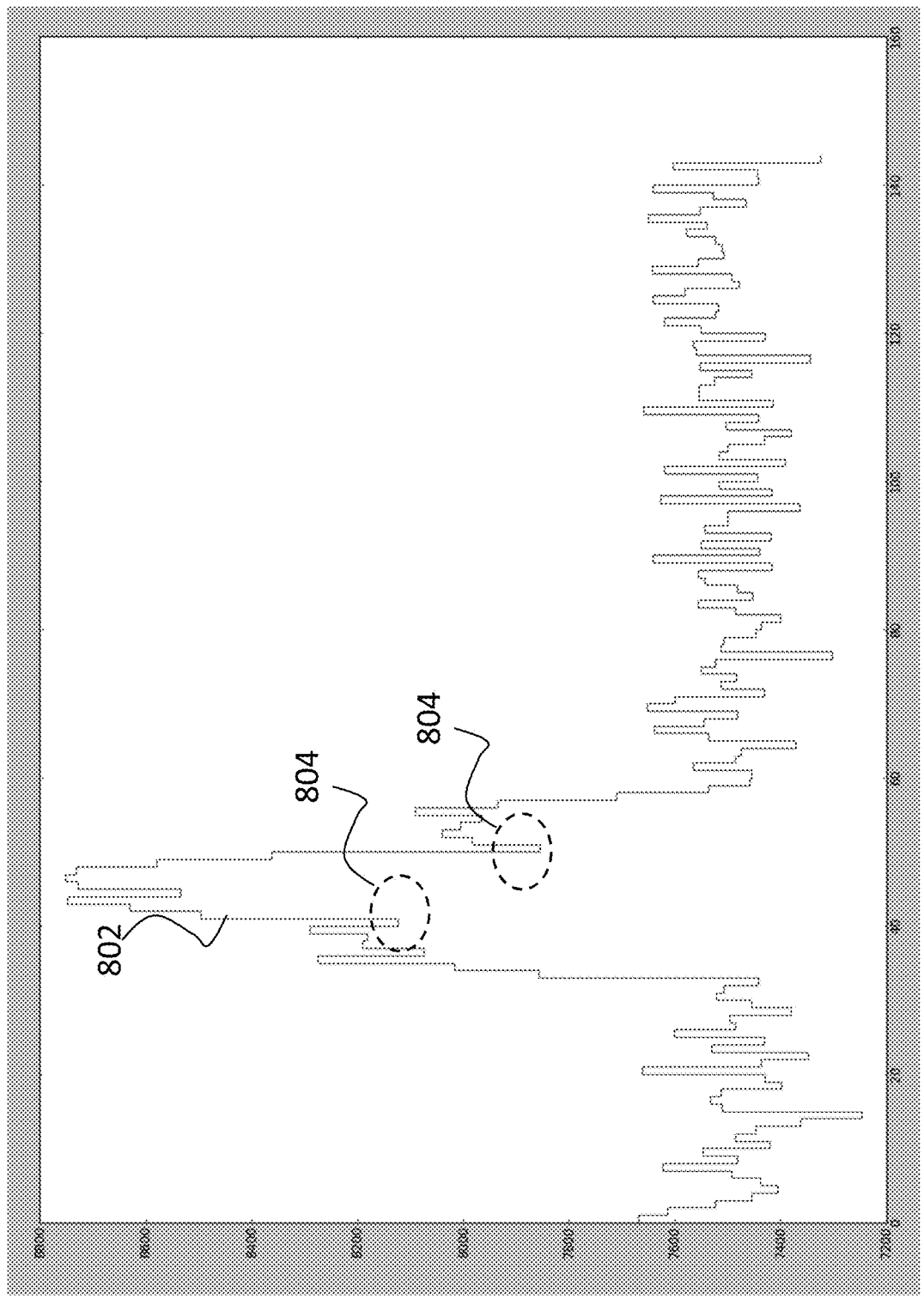

While FIG. 7 illustrates a simple and straightforward segmentation by the pulse segmentation circuit 506, FIGS. 8A-8B illustrate more realistic examples of raw histogram data 302 generated by optical detector 104. In FIG. 8A, the raw histogram data 302 generated after reception of the reflected radiation 118 from one or more objects 101 indicates that the pulses received by the optical sensor 100 have a low signal-to-noise ratio. In FIG. 8B, the raw histogram data 302 generated after reception of the reflected radiation 118 from one or more objects 101 indicates that the pulses received by the optical sensor 100 have a high signal-to-noise ratio, but such raw histogram data 302 may be caused by the merging or superposition of reflected radiation 118 from two or more objects 101. In other words, the peak 802 observed in the raw histogram data 302 of FIG. 8B may be caused by reflected radiation 118 coming from one object 101 or may be caused by the super position of reflected radiation 118 having different phases and coming from different objects 101. Consequently, the pulse segmentation circuit 506 needs to be able to extract pulses in a noisy signal (such as in the raw histogram data 302 of FIG. 8A) and to differentiate between merged pulses caused by two or more objects 101 (such as in the raw histogram data 302 of FIG. 8B).

While thresholding operations have been suggested for the pulse segmentation circuit 506, such thresholding operations do not use amplitude variations inherently present in histogram data to generate the plurality of segmented histograms 508. For example, a simple thresholding operation executed on the raw histogram data 302 of FIG. 8A may erroneously indicate that no pulse is present since the minute amplitude variations present in the raw histogram data 302 are not taken into account. Furthermore, thresholding operations do not account for notches between partially merged pulses. For example, a simple thresholding operation executed on the raw histogram data 302 of FIG. 8B may erroneously indicate that only one pulse is present since the notches 804 between partially merged objects are ignored. Additionally, thresholding operations may not adequately account for systematic mismatches and double reflections. Consequently, there may be a need for a pulse segmentation circuit 506 that is configured to find pulses in a noisy histogram (such as the histogram in FIG. 8A) and to differentiate between merged pulses caused by two or more objects 101 (such as in the histogram in FIG. 8B).

Time-Domain Modeling of Reflected Radiation 118 Received at Optical Detector 104

The time-domain optical signal received at the optical detector may be expressed as a superposition of several reflected signals with the following parameters:

$$A=\{a_1, \ldots, a_n\}$$

$$T=\{t_1, \ldots, t_n\}$$

$$S=\{s_1, \ldots, s_n\}$$

where n is the number of reflecting objects 101; A is a vector of amplitudes, with a respective amplitude $a_i$ being associated with a respective reflected pulse i of the n reflected pulses; T is a vector of time delays, with a respective time delay $t_i$ being associated with a respective reflected pulse i of the n reflected pulses; and S is a vector of spreading factors, with a respective spreading factor $s_i$ being associated with a respective reflected pulse i of the n reflected pulses. It is noted that although vectors of amplitudes A, time delays T, and spreading factors S can be used to represent the time-domain optical signal received at the optical detector, a subset of these parameters may be used in other examples. Furthermore, in yet other examples, additional parameters such as positive skew (PQ) which may result in the pulse shape becoming biased towards the front (practically this may be caused by either the signal fall off vs distance in a slanted target or congestion in the SPAD array which favors the front of the pulse). Alternatively the pulse may undergo a negative skew (NQ). The pulse may also undergo a shape change due to an environmental parameter such as temperature (Temp) or a different set of parameters may be used to represent the time-domain optical signal received at the optical detector.

As such, in the above example, an ideal time-domain optical signal received at the optical detector 104 (denoted as signal S (n, A, S, T, t)) may be expressed as:

$$S(n, A, S, T, t) = \sum_{i=1}^{n} a_i \times p(s_i(t-t_i))$$

where p(t) is the pulse transmitted from the optical sensor 100 to each object 101, and where $p(s_i(t-t_i))$ denotes the return pulse received at the optical detector 104 from the $i^{th}$ object when the pulse p(t) undergoes a delay of $t_i$ seconds and a spreading factor of $s_i$. It is noted that the pulse p(t) represents a transmitted VCSEL pulse shape with zero time delay, normalized amplitude and zero spread. Consequently, $p(s_i(t-t_i))$ represents a received VCSEL pulse shape with a time delay of $t_i$ due to the target distance and widened by a spreading operator $s_i$ due to target depth or slant.

However, an actual time-domain optical signal received at the optical detector 104 (denoted as signal W) may be corrupted by noise contributions that have different origins, examples being shot noise and ambient noise. The probability distribution and parameters for shot noise and ambient noise are generally known. For example, the number of shot noise events in a particular time bin may be estimated by a Poisson distribution, while the number of ambient noise events in a particular time bin may be estimated by a Gaussian distribution. In view of the above, the pulse segmentation circuit 506 may be configured to estimate the parameter set θ={n, A, T, S} that minimizes the distance between the ideal time-domain optical signal S and the actual time-domain optical signal W received at the optical detector 104, where such a distance between these functions is denoted as:

$$d\left(W, \sum_{i=1}^{n} a_i \times p(s_i(t-t_i))\right)$$

In general, the parameter set θ={n, A, T, S} is unknown and needs to be estimated. Although the parameter set θ is unknown, the raw histogram data 302 generated by the optical detector 104 can be regarded as a result of N independent experiments $(x_1, \ldots, x_N) \in [\![0, NB_{BIN}]\!]^N$, where each $x_i$ is an outcome of a random variable X, where the measurements $x_1, \ldots, x_N$ are independent and identically distributed, and where $NB_{BIN}$ represents the number of discrete bins in the histogram. For example, the histograms in FIGS. 7, 8A, 8B, and 9 contain 144 histogram bins and $NB_{BIN}=144$ in these examples. Consequently, the distance between the ideal time-domain optical signal S and the actual time-domain optical signal W received at the optical detector 104 can be expressed as being dependent on a likelihood function as follows:

$$d\left(W, \sum_{i=0}^{n} a_i \times p(s_i(t-t_i))\right) = 1 - \prod_{i=0}^{N} \mathbb{P}(X = x_i \mid n, A, T, S)$$

where $\mathbb{P}(X=x_i|n, A, T, S)$ is the univariate distribution of the outcome $x_i$ given the parameter set θ={L, A, T, S}. It follows from the above expression that the minimum distance between the ideal time-domain optical signal S and the actual time-domain optical signal W received at the optical detector 104 is obtained when the likelihood function $$\prod_{i=0}^{N} \mathbb{P}(X = x_i \mid n, A, T, S)$$

is maximized.

Statistical View of Raw Histogram Data 302

Figure 9:
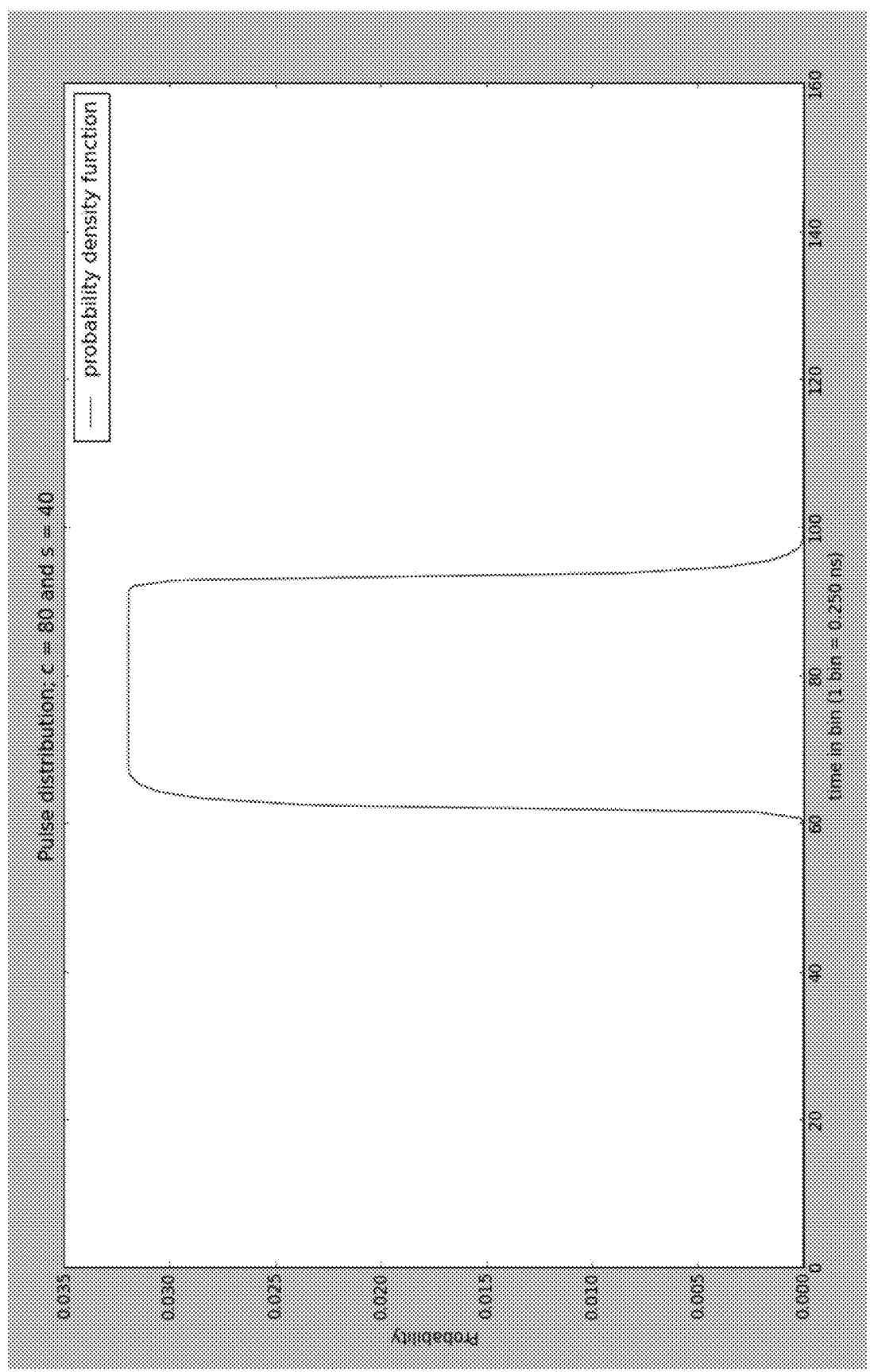

As discussed above, the raw histogram data 302 generated by the optical detector 104 can be regarded as the result of N independent experiments $(x_1, \ldots, x_N) \in [\![0, NB_{BIN}]\!]^N$, where each $x_i$ is an outcome of a random variable X, and where the measurements $x_1, \ldots, x_N$ are independent and identically distributed. Consequently, each return pulse (from a respective object 101) at the optical detector 104 may be viewed a probability density function centered at some $c \in [0, NB_{BIN}]$ and having a non-zero spread s. FIG. 9 shows an example of a probability density function having a center at the $80^{th}$ time bin and having a spread of 40 time bins.

Expectation-maximization (EM) is a method to find the maximum likelihood estimator of a parameter θ of a probability distribution. The EM algorithm is an efficient iterative procedure to compute the Maximum Likelihood (ML) estimate in the presence of missing or hidden data. In ML estimation, the parameter set θ={n, A, T, S} for which the observed data $(x_1, \ldots, x_N) \in [\![ 0, NB_{BIN} ]\!]^N$ are the most likely is estimated. Every iteration of the EM algorithm includes two processes: an expectation step and a maximization step. In the expectation step, or E-step, the missing data are estimated given the observed data and current estimate of the model parameters. This is achieved using the conditional expectation. In the maximization step, or M-step, the likelihood function is maximized under the assumption that the missing data are known. The estimate of the missing data from the E-step is used in lieu of the actual missing data. Convergence is assured since the algorithm is guaranteed to increase the likelihood at each iteration. The steps of the EM algorithm may be summarized as follows:
Initialization:
Initialize parameter set θ={n, A, T, S} and latent random variable$(z_1, \ldots, z_N) \in [\![ 0, n ]\!]_N$, where the latent random variable $(z_1, \ldots, z_N) \in [\![ 0, n ]\!]^N$ denotes the dummy variable used as the histogram bin index.
EM Algorithm:
Perform the following until convergence is reached:

$$Q_i(z_i)) := \mathbb{P}(z_i \mid x_i; \theta) = \frac{\mathbb{P}(z_i, x_i; \theta)}{\sum_{j=0}^{N} \mathbb{P}(x_i, z_j; \theta)}$$

$$\theta := \underset{\theta}{\arg\max} \sum_i Q_i(z_i) \log \frac{\mathbb{P}(x_i, z_i; \theta)}{Q_i(z_i)}$$

Figure 10A:
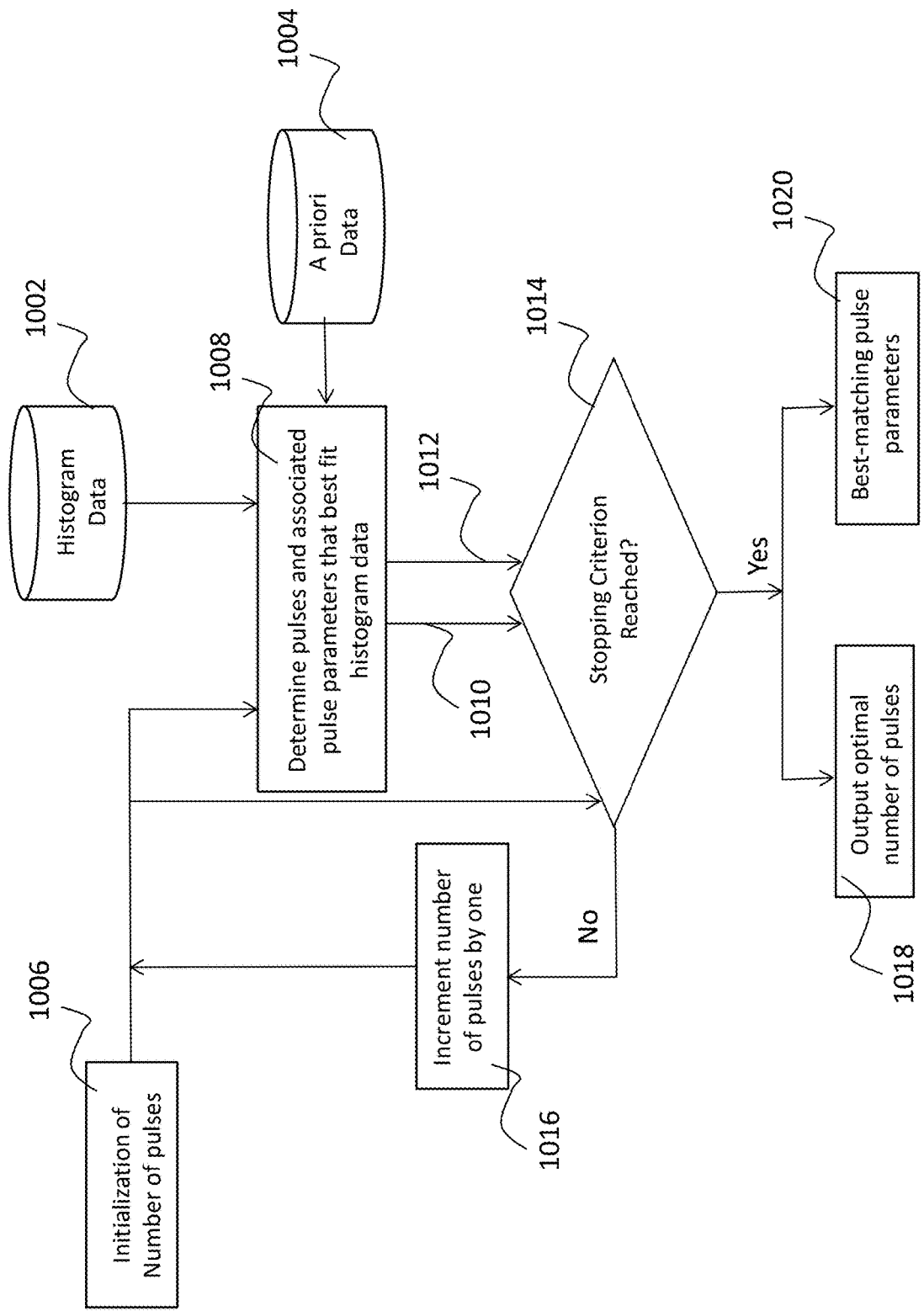
Figure 10B:
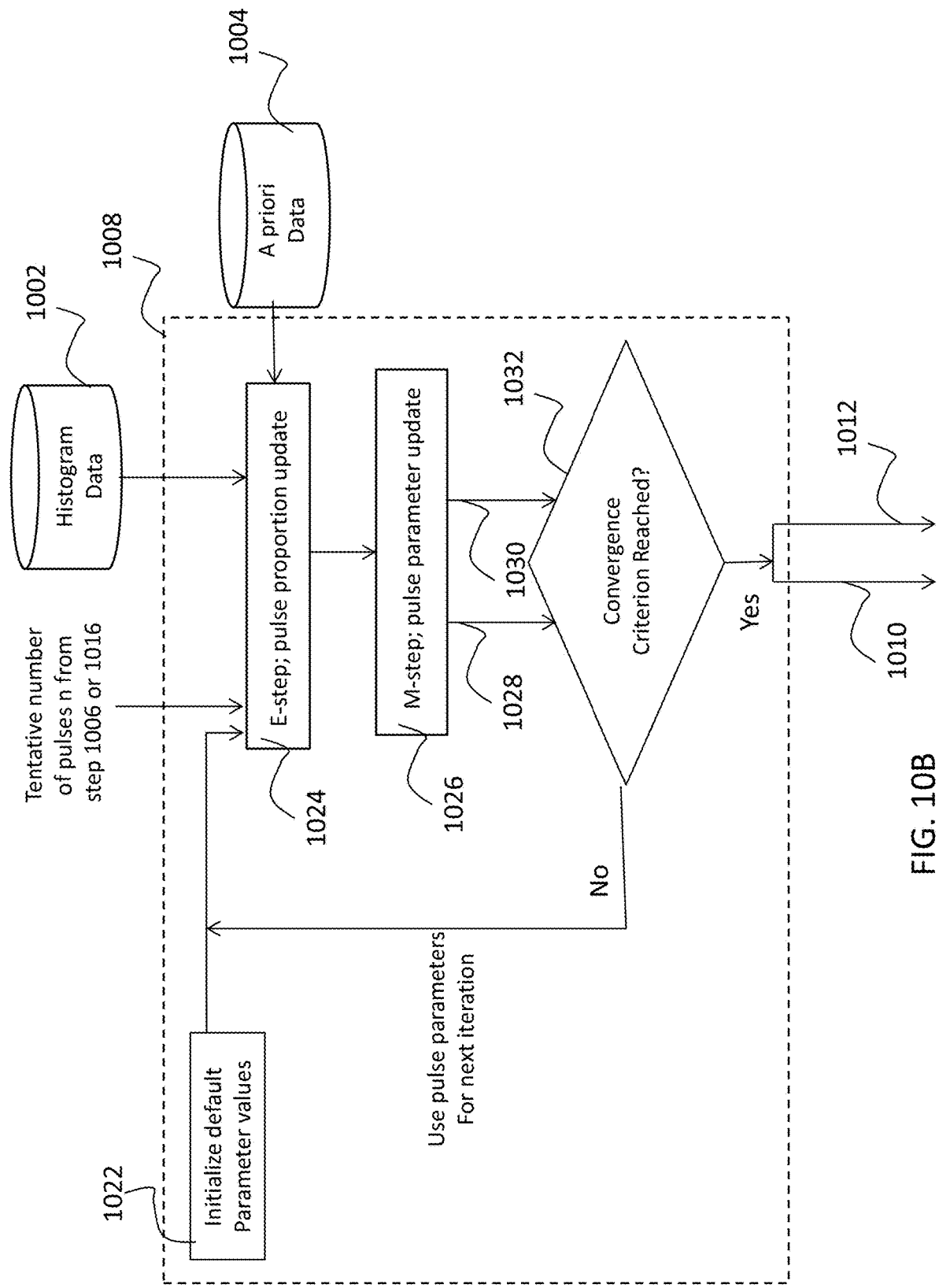

FIGS. 10A and 10B illustrate a method 1000 for estimating the parameter set θ={n, A, T, S} using the EM algorithm, in accordance with an embodiment. The method 1000 may be executed by the processor 126. As shown in FIG. 10A, the method 1000 operates on histogram data 1002 (e.g. raw histogram data 302 or cross-talk compensated histogram data 504) and includes the use of a priori data 1004, such as a priori parametrizable pulse shapes and a priori pulse parameters 1004. The a priori parametrizable pulse shapes may be determined from simulation or characterisation of the transmitted VCSEL/emitter pulse. For example, the pulse may have an RC evolution of the rising or falling edge depending on the VCSEL/emitter driver design and the VCSEL/emitter itself, which can be ascertained at manufacture or test of the VCSEL. Alternatively, it may have any arbitrary shape depending upon the nature and configuration of the driver and emitter. The pulse shape may also be influenced by the response of the receiver. For example, the SPAD response may act as a low pass filter to the transmitted pulse shape before it is 'seen' by the EM algorithm. The a priori parametrizable pulse shapes may also vary with temperature or part to part, therefore, the a priori pulse shape may be adapted with temperature if known. The parameters n, A, S and T represent further transformation of this native pulse shape due to the scene that the pulse interacts with. For example, parameter n depends on how many discrete targets the transmitted pulse encounters in the scene, parameter S depends on the depth or slant of those n targets, parameter A depends on the reflectance and distance to the n targets, and parameter T also depends on the distance to the n targets.

In some embodiments, the histogram data 1002 and the a priori data 1004 may be stored in memory that is accessible by the processor 126. The method 1000 includes initialization step 1006 where the number of pulses is assumed to be zero (i.e., n=0), thus assuming that no reflecting objects 101 are in the field-of-view of the optical sensor 100. The method 1000 further includes step 1008, where the above-mentioned EM algorithm is executed, for a particular number of pulses n, to determine the pulses and the associated pulse parameters that best fit the observed data. Further details regarding step 1008 are shown in FIG. 10B, described below. The step 1008 outputs a likelihood score 1010 and the pulse parameters 1012 that best fit the observed data (as determined by the EM algorithm). Such pulse parameters 1012 may include pulse center (which is related to the distance between an object 101 and the optical sensor 100), the pulse width, the pulse height/proportion, and/or the ambient level/proportion. The method 1000 further includes a step 1014 where a determination is made whether a stopping criterion is reached. In response to a determination that the stopping criterion is not achieved, the method 1000 proceeds to step 1016 where the number of assumed pulses is incremented (i.e. n is incremented) and the steps of 1008 and 1014 are repeated until the stopping criterion is reached. Upon reaching the stopping criterion in step 1014, the method 1000 then outputs the optimal number of pulses 1018 and the best matching pulse parameters 1020 for the optimal number of pulses 1018. The steps 1006, 1008, 1014, and 1016 illustrate an outer loop of the method 1000, with such outer loop running the statistical method over an increasing number of pulses n until there are diminishing returns from increasing the number of pulses n further.

Referring now to FIG. 10B, further details of the step 1008, where the above-mentioned EM algorithm is executed, is provided. The step 1008 accepts, as inputs, the histogram data 1002, the a priori data 1004, and the tentative number of pulses n (e.g. from step 1006 and/or step 1016). Step 1008 includes an initialization step 1022 where default parameter values are assigned to the a priori parametrizable pulse shapes. For example, each distribution is assumed to have a proportion or height of 1/(n+1) and the center of each distribution is assumed to be centered at the highest bin of the histogram data 1002. The step 1008 includes the expectation step 1024, where the pulse proportions for the parametrizable pulse shapes are updated. In order to execute the expectation step 1024, a conditional probability is determined as follows:

$$t_{k,i} = \frac{\pi_k \mathbb{P}(x_i \mid z_k)}{\sum_{j=0}^{n} \pi_j \mathbb{P}(x_i \mid z_j)}$$

where $\pi_k$ is the proportion of the $k^{th}$ pulse. The conditional probability is determined for all i=0, . . . , N, and the proportions are updated using the conditional probabilities as follows:

$$\pi'_k = \frac{1}{N} \sum_{i=0}^{N} t_{k,i} x_i$$

The updated proportions are output from the step 1024 and passed to the maximization step 1026, where pulse parameters (e.g. pulse center and pulse spread) are updated in order to maximize the likelihood function. The maximization step 1026 can be expressed as follows:

$$\theta := \operatorname*{argmax}_{\theta} \sum_i Q_i(z_i) \log \frac{\mathbb{P}(x_i, z_i; \theta)}{Q_i(z_i)}$$

where the parameter set θ that maximizes the likelihood function includes an estimated pulse center $c_k$ and an estimated spread factor $s_k$ for the $k^{th}$ pulse.

It may be assumed that the estimated pulse centers $c_k$ and the estimated spread factors $s_k$ depend on the first and second moments of the N independent experiments$(x_1, \ldots, x_N) \in [\![0, NB_{BIN}]\!]^N$. In this regard, the first moment m1 and the second moment m2 may be expressed as follows.

$$m_1 = \frac{1}{N} \sum_{i=0}^{N} x_i$$

$$m_2 = \sqrt{\frac{1}{N} \sum_{i=0}^{N} (x_i - m_1)^2}$$

Figures 11A, 11B:
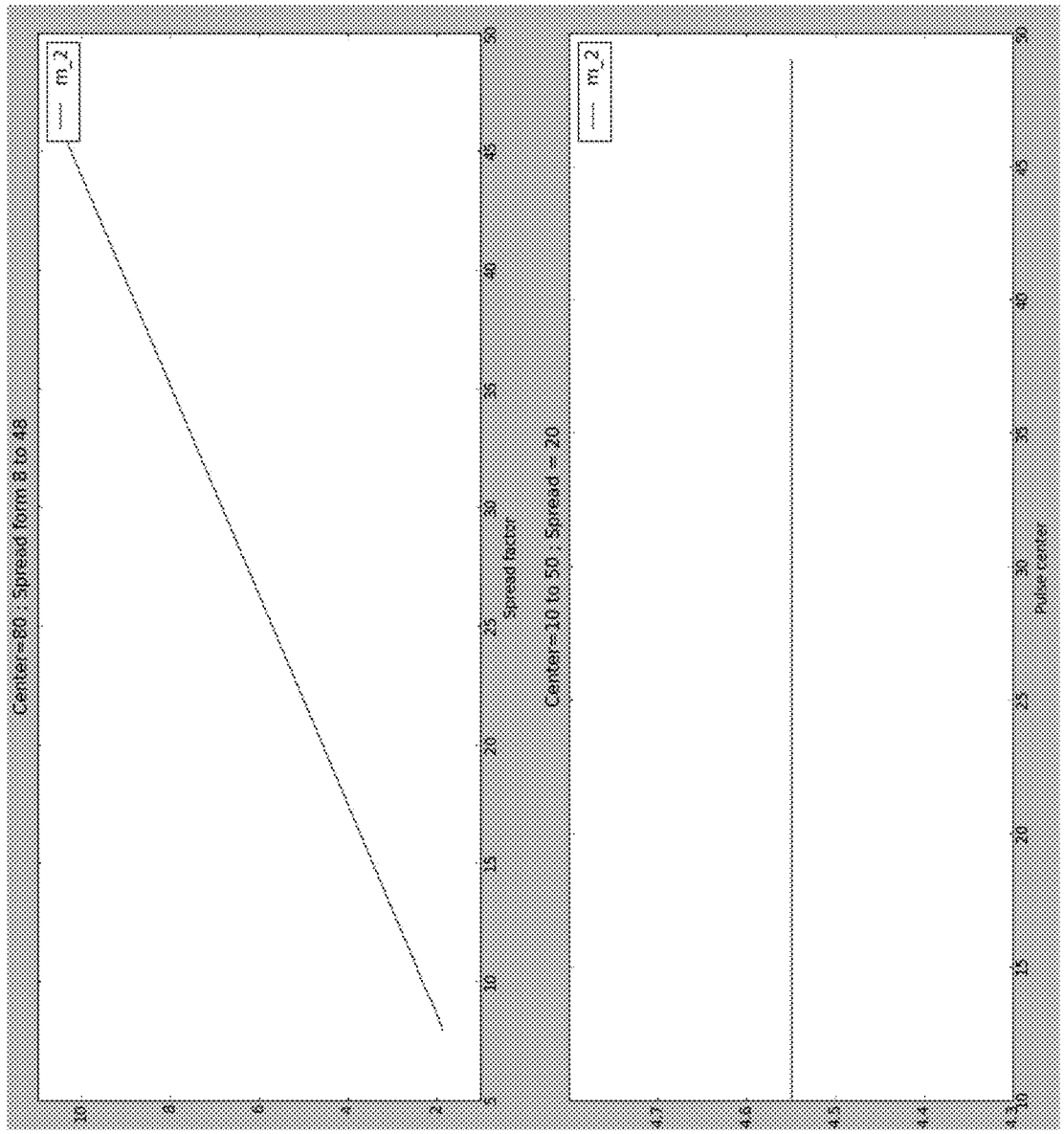
Figures 12A, 12B:
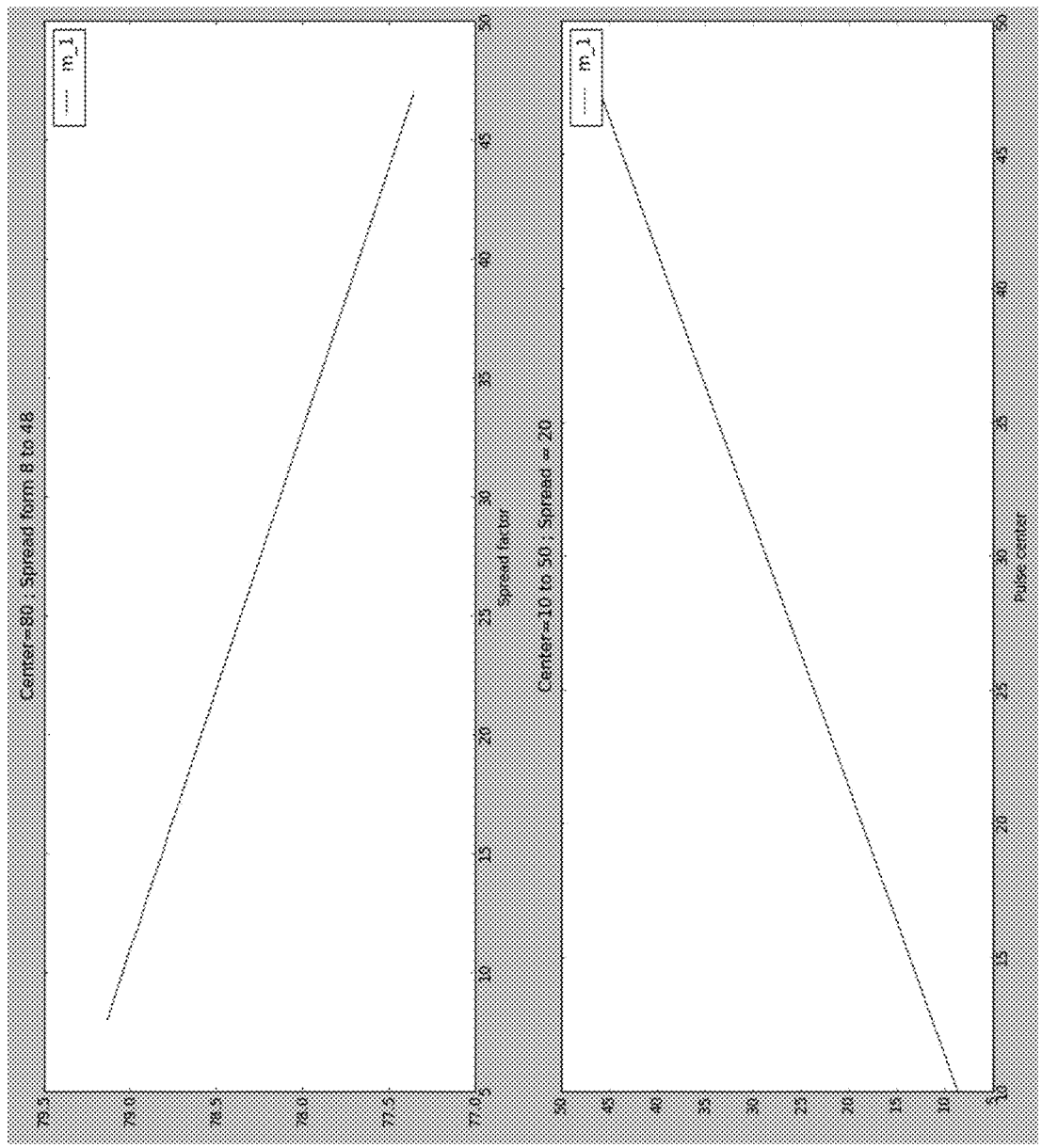

FIGS. 11A and 11B show a linear regression of the second moment m2 as a function of the estimated pulse centers $c_k$ and the estimated spread factors $s_k$, in accordance with an embodiment. FIGS. 12A and 12B show a linear regression of the first moment m1 as a function of the estimated pulse centers $c_k$ and the estimated spread factors $s_k$, in accordance with an embodiment. As seen from FIGS. 11A and 11B, the second moment m2 is independent of the pulse centers $c_k$, but varies linearly with the spread factors $s_k$. Consequently, the second moment m2 may be expressed as m2=s.g1+g2, where g1 and g2 are real numbers. Similarly, as seen from FIGS. 12A and 12B, the first moment m1 varies linearly with the pulse centers $c_k$ and also varies linearly with the spread factors $s_k$. The first moment m1 may be expressed as m1=s.f1+c.f2+f3, where f1, f2, and f3 are real numbers. Based on the observations in FIGS. 11A-11B and 12A-12B, the parameter set θ that maximizes the likelihood function may be expressed as:

$$s_k = \frac{1}{g_1}\left(\sqrt{\frac{1}{N} \frac{\sum_{i=0}^{N} t_{k,i}(x_i - m_1)^2}{\sum_{i=0}^{N} t_{k,i}}} - g_2\right)$$

$$c_k = \frac{m_1 - sf_1 - f_3}{f_2}$$

The output of the maximization step 1026 includes the estimated pulse parameters 1028 (namely, the estimated pulse centers $c_k$ and the estimated spread factors $s_k$) and the likelihood 1030, which are passed to step 1032, which determines if a convergence criterion is reached. In some embodiments, the likelihood 1030 from step 1026 is converted to a log-likelihood value (according to methods known in the art). An example of the log-likelihood value is shown as follows:

$$l(\theta) = \sum_{i=0}^{N} \log\left(\sum_{k=0}^{n} \pi_k \mathbb{P}(x_i \mid c_k, s_k)\right)$$

In some embodiments of the step 1032, a difference between a log-likelihood of a current iteration of the EM algorithm and a log-likelihood of a most-previous iteration of the EM algorithm is determined. A negative result indicates that the log-likelihood of the current iteration of the EM algorithm is less than the log-likelihood of the most-previous iteration of the EM algorithm. In some embodiments, an occurrence of a consecutive plurality of such negative results (e.g. about 20 consecutive negative differences) may signify that the convergence criterion of step 1032 has been reached. In such cases, the step 1032 outputs the highest likelihood score 1030 and its associated pulse parameters 1028 from step 1026 to the stopping criterion step 1014 shown in FIG. 10A. In other embodiments, the determined difference is compared against a threshold (e.g. about 0.001). In such embodiments, in response to a determination that the difference is greater than the threshold, the step 1032 uses the estimated pulse centers $c_k$ and the estimated spread factors $s_k$ from step 1026 for the next iteration of the EM algorithm in steps 1024 and 1026. On the other hand, in response to a determination that the difference is less than the threshold (e.g. about 0.001), the step 1032 outputs the highest likelihood score 1030 and its associated pulse parameters 1028 from step 1026 to the stopping criterion step 1014 shown in FIG. 10A. As such, based on the above description of the EM algorithm of step 1008, the inner loop of method 1000 (executed by the iteration of step 1008) optimizes the fit of the pulses to the observed data $(x_1, \ldots, x_N) \in [\![0, NB_{BIN}]\!]^N$(e.g. by estimating the pulse centers and spread factors for the assumed number of pulses n).

Referring back to FIG. 10A, as discussed above, the method 1000 further includes a step 1014 where a determination is made if a stopping criterion is reached. In some embodiments, the stopping criterion of step 1014 may be based on the likelihood score provided to step 1014 by the convergence criterion step 132 of step 1008. As an example, a score may be determined for each set of parameters and its associated likelihood score as follows:

score=10n log N–l(θ)

In general, the lowest score is chosen (e.g. since the log likelihood function l(θ) is maximized). Consequently, the method 1000 discussed above is able to isolate pulses from multiple objects 101 from a single histogram (e.g. the cross-talk compensated histogram data 504) and to determine the distance between the optical sensor 100 and each object 101 on a per-object basis, thus implementing the functions of the pulse segmentation circuit 506 and the parameter extraction circuit 510.

An embodiment device includes: a plurality of optical emitters configured to emit incident radiation within a field of view of the device; a plurality of optical detectors configured to receive reflected radiation and to generate a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and a processor configured to iteratively process the histogram by executing an expectation-maximization algorithm to detect a presence of objects located in the field of view of the device.

An embodiment method includes: emitting incident radiation using a plurality of optical emitters of a sensor device; receiving reflected radiation using a plurality of optical detectors from one or more objects located in a field of view of the sensor device; generating, by a processor, a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and iteratively processing the histogram by executing an expectation-maximization algorithm to determine a number of the one or more objects located in the field of view of the sensor device.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
a plurality of optical emitters configured to emit incident radiation within a field of view of the device;
a plurality of optical detectors configured to receive reflected radiation and to generate a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and
a processor programmed to iteratively process the histogram by executing an expectation-maximization algorithm to detect a presence of objects located in the field of view of the device.

2. The device of claim 1, wherein executing the expectation-maximization algorithm to detect the presence of objects located in the field of view of the device comprises executing the expectation-maximization algorithm to detect a number of objects located in the field of view of the device.

3. The device of claim 1, wherein executing the expectation-maximization algorithm to detect the presence of objects located in the field of view of the device comprises:
selecting a respective initial pulse proportion, a respective initial pulse center, and a respective initial spread factor for each of a first number of parametrizable pulse shapes;
updating a respective pulse proportion for each of the first number of parametrizable pulse shapes based on the respective initial pulse center and the respective initial spread factor;
updating a respective pulse center and a respective spread factor for each of the first number of parametrizable pulse shapes based on the respective pulse proportion;
determining a respective likelihood associated with the respective pulse center and the respective spread factor for each of the first number of parametrizable pulse shapes; and
determining whether a first convergence criterion has been satisfied.

4. The device of claim 3, wherein determining whether the first convergence criterion has been satisfied comprises:
determining a likelihood difference between the respective likelihood of a current iteration of the expectation-maximization algorithm and the respective likelihood of a most-previous current iteration of the expectation-maximization algorithm; and
determining whether the first convergence criterion has been satisfied based on the likelihood difference.

5. The device of claim 4, wherein determining whether the first convergence criterion has been satisfied based on the likelihood difference comprises:
determining that the first convergence criterion has been satisfied in response to the likelihood difference being negative for a predetermined number of consecutive iterations of the expectation-maximization algorithm.

6. The device of claim 4, wherein determining whether the first convergence criterion has been satisfied based on the likelihood difference comprises:
   determining that the first convergence criterion has been satisfied in response to the likelihood difference being less than a first threshold.

7. The device of claim 3, further comprising:
   in response to a determination that the first convergence criterion has not been satisfied, designating the respective pulse proportion, the respective pulse center, and the respective spread factor as the respective initial pulse proportion, the respective initial pulse center, and the respective initial spread factor for each of the first number of parametrizable pulse shapes; and
   repeating an update of the respective pulse proportion, the respective pulse center, and a respective spread factor for each of a first number of parametrizable pulse shapes.

8. The device of claim 3, further comprising:
   in response to a determination that the first convergence criterion has been satisfied, selecting the respective pulse proportion, the respective pulse center, and the respective spread factor of a most-recent iteration of the expectation-maximization algorithm as respective pulse parameters for each of the first number of parametrizable pulse shapes; and
   determining whether a second convergence criterion has been satisfied based on the respective likelihood associated with the respective pulse parameters.

9. The device of claim 8, wherein determining whether the second convergence criterion has been satisfied comprises:
   determining a log likelihood function based on the respective likelihood associated with the respective pulse parameters;
   determining a score based on the log likelihood function; and
   determining that the second convergence criterion has been satisfied in response to the score being less than a second threshold.

10. The device of claim 8, further comprising:
    incrementing the first number of parametrizable pulse shapes to generate a second number of parametrizable pulse shapes in response to a determination that the second convergence criterion has not been satisfied;
    selecting a respective initial pulse proportion, a respective initial pulse center, and a respective initial spread factor for each of the second number of parametrizable pulse shapes;
    updating a respective pulse proportion for each of the second number of parametrizable pulse shapes based on the respective initial pulse center and the respective initial spread factor;
    updating a respective pulse center and a respective spread factor for each of the second number of parametrizable pulse shapes based on the respective pulse proportion;
    determining a respective likelihood associated with the respective pulse center and the respective spread factor for each of the second number of parametrizable pulse shapes; and
    determining whether the first convergence criterion has been satisfied.

11. The device of claim 8, further comprising detecting the presence of objects located in the field of view of the device based on the respective pulse proportion, the respective pulse center, and the respective spread factor in response to a determination that the second convergence criterion has been satisfied.

12. The device of claim 1, wherein the plurality of optical detectors comprises at least one of photo diodes, avalanche photo diodes, or single-photon avalanche diodes.

13. The device of claim 1, wherein the plurality of optical emitters comprises at least one of vertical-cavity surface-emitting lasers, quantum well lasers, quantum cascade lasers, inter-band cascade lasers, or vertical external-cavity surface-emitting lasers.

14. The device of claim 1, wherein the plurality of optical emitters are configured for at least one of continuous wave operation, quasi-continuous wave operation, or pulsed operation.

15. A method, comprising:
    emitting incident radiation using a plurality of optical emitters of a sensor device;
    receiving reflected radiation using a plurality of optical detectors from one or more objects located in a field of view of the sensor device;
    generating, by a processor, a histogram based on the incident radiation and the reflected radiation, the histogram being indicative of a number of photon events detected by the plurality of optical detectors over a plurality of time bins, the plurality of time bins being indicative of a plurality of time differences between emission of the incident radiation and reception of the reflected radiation; and
    iteratively processing the histogram by executing an expectation-maximization algorithm to determine a number of the one or more objects located in the field of view of the sensor device.

16. The method of claim 15, wherein iteratively processing the histogram by executing the expectation-maximization algorithm comprises:
    selecting a respective initial pulse proportion, a respective initial pulse center, and a respective initial spread factor for each of a first number of parametrizable pulse shapes;
    updating a respective pulse proportion for each of the first number of parametrizable pulse shapes based on the respective initial pulse center and the respective initial spread factor;
    updating a respective pulse center and a respective spread factor for each of the first number of parametrizable pulse shapes based on the respective pulse proportion;
    determining a respective likelihood associated with the respective pulse center and the respective spread factor for each of the first number of parametrizable pulse shapes; and
    determining whether a first convergence criterion has been satisfied.

17. The method of claim 16, further comprising:
    in response to a determination that the first convergence criterion has not been satisfied, designating the respective pulse proportion, the respective pulse center, and the respective spread factor as the respective initial pulse proportion, the respective initial pulse center, and the respective initial spread factor for each of the first number of parametrizable pulse shapes; and
    repeating an update of the respective pulse proportion, the respective pulse center, and a respective spread factor for each of a first number of parametrizable pulse shapes.

18. The method of claim 16, further comprising:

in response to a determination that the first convergence criterion has been satisfied, selecting the respective pulse proportion, the respective pulse center, and the respective spread factor of a most-recent iteration of the expectation-maximization algorithm as respective pulse parameters for each of the first number of parametrizable pulse shapes; and determining whether a second convergence criterion has been satisfied based on the respective likelihood associated with the respective pulse parameters.

19. The method of claim 18, wherein determining whether the second convergence criterion has been satisfied comprises:

determining a log likelihood function based on the respective likelihood associated with the respective pulse parameters;

determining a score based on the log likelihood function; and determining that the second convergence criterion has been satisfied in response to the score being less than a second threshold.

20. The method of claim 18, further comprising:

incrementing the first number of parametrizable pulse shapes to generate a second number of parametrizable pulse shapes in response to a determination that the second convergence criterion has not been satisfied; and selecting a respective initial pulse proportion, a respective initial pulse center, and a respective initial spread factor for each of the second number of parametrizable pulse shapes;

updating a respective pulse proportion for each of the second number of parametrizable pulse shapes based on the respective initial pulse center and the respective initial spread factor;

updating a respective pulse center and a respective spread factor for each of the second number of parametrizable pulse shapes based on the respective pulse proportion;

determining a respective likelihood associated with the respective pulse center and the respective spread factor for each of the second number of parametrizable pulse shapes; and determining whether the first convergence criterion has been satisfied.

* * * * *